(12) United States Patent
Grisin et al.

(10) Patent No.: US 8,839,833 B2
(45) Date of Patent: Sep. 23, 2014

(54) TIRE BEAD FOR A LARGE GOODS VEHICLE

(75) Inventors: Bopha Grisin, Mozac (FR); Chris Boyer, Cournon d'Auvergne (FR)

(73) Assignees: Michelin Recherche et Techniques S.A., Grangers-Paccot (CH); Compagnie Generale des Etablissements Michelin, Clemont-Ferrand (FR)

( * ) Notice: Subject to any disclaimer, the term of this patent is extended or adjusted under 35 U.S.C. 154(b) by 212 days.

(21) Appl. No.: 13/380,479

(22) PCT Filed: Jun. 17, 2010

(86) PCT No.: PCT/EP2010/058560
§ 371 (c)(1),
(2), (4) Date: Mar. 19, 2012

(87) PCT Pub. No.: WO2010/149570
PCT Pub. Date: Dec. 29, 2010

(65) Prior Publication Data
US 2012/0160390 A1    Jun. 28, 2012

(30) Foreign Application Priority Data

Jun. 22, 2009    (FR) .................................... 09 03046

(51) Int. Cl.
*B60C 15/06*    (2006.01)
(52) U.S. Cl.
CPC ............. *B60C 15/06* (2013.01); *B60C 15/0603* (2013.04); *B60C 15/0628* (2013.04); *B60C 15/0607* (2013.04)
USPC ............................ 152/541; 152/546; 152/547
(58) Field of Classification Search
USPC ......................................... 152/541, 546, 547
See application file for complete search history.

(56) References Cited

U.S. PATENT DOCUMENTS

| | | | | |
|---|---|---|---|---|
| 3,722,568 A | * | 3/1973 | Maiocchi | 152/541 |
| 4,962,803 A | | 10/1990 | Welter | |
| 5,868,190 A | * | 2/1999 | Willard et al. | 152/547 X |
| 6,910,513 B2 | * | 6/2005 | Ferlin | 152/541 X |
| 2005/0133135 A1 | | 6/2005 | Corvasce et al. | |

FOREIGN PATENT DOCUMENTS

| | | | |
|---|---|---|---|
| EP | 1 759 892 A2 | * | 3/2007 |
| GB | 1 549 997 | * | 8/1979 |
| JP | 60092103 A | * | 5/1985 |
| JP | 03248903 A | * | 11/1991 |
| JP | 05124408 A | * | 5/1993 |
| JP | 06234310 A | * | 8/1994 |
| JP | 10-147116 | | 6/1998 |
| JP | 2007-301830 | | 11/2007 |
| JP | 2009101943 A | * | 5/2009 |
| WO | WO 01/81103 | | 11/2001 |

* cited by examiner

OTHER PUBLICATIONS

English machine translation of JP 10-147116 A, Jun. 2, 1998.*

*Primary Examiner* — Adrienne C Johnstone
(74) *Attorney, Agent, or Firm* — Cozen O'Connor

(57) ABSTRACT

A tire having two beads and a carcass reinforcement with a main part wrapped within each bead around a bead wire core to form a turned-back portion. Each bead has an additional reinforcement and a filler profiled element extending the bead wire core radially outwards. This filler profiled element has, in any meridian plane, a three exterior sides including a radially inner side, axially inner side and axially outer side, with the axially inner and outer sides converging at a radially outermost point, and is formed of a stack in the radial direction of at least three polymer materials in contact along a contact surface that intersects any meridian plane along a meridian line.

9 Claims, 5 Drawing Sheets

TIRE BEAD FOR A LARGE GOODS VEHICLE

RELATED APPLICATIONS

This is a U.S. national stage under 35 USC §371 of application No. PCT/EP2010/058560, filed on Jun. 17, 2010.

This application claims the priority of French application no. 09/03046 filed Jun. 22, 2009, the entire content of which is hereby incorporated by reference.

FIELD OF THE INVENTION

The present invention relates to the tires fitted to heavy goods vehicles, such as commercial vehicles intended for transporting heavy loads. It relates more particularly to radial tires.

This invention more specifically covers the beads of the tire, that is to say those parts of the tire which provide the mechanical connection between the tire and the rim on which it is mounted. A tire thus comprises two beads, connected respectively via two sidewalls to a tread strip that is intended to come into contact with the ground via a tread surface.

BACKGROUND OF THE INVENTION

The following text uses the following definitions:
"meridian plane": a plane containing the axis of rotation of the tire.
"equatorial plane": the plane passing through the middle of the tread surface and which is perpendicular to the axis of rotation of the tire.
"radial direction": a direction perpendicular to the axis of rotation of the tire.
"axial direction": a direction parallel to the axis of rotation of the tire.
"circumferential direction": a direction perpendicular to a meridian plane.
"radial distance": a distance measured perpendicular to the axis of rotation of the tire and from the axis of rotation of the tire.
"axial distance": a distance measured parallel to the axis of rotation of the tire and from the equatorial plane.
"radially": in a radial direction.
"axially": in an axial direction.
"radially inside/radially outside": the radial distance of which is smaller/larger.
"radially closest to/radially furthest from": the radial distance of which is minimal/maximal.
"axially inside/axially outside": the axial distance of which is smaller/greater.
"axially closest to/axially furthest from": the axial distance of which is minimal/maximal.

A radial tire more specifically comprises a reinforcement comprising a crown reinforcement, radially on the inside of the tread strip, and a carcass reinforcement radially on the inside of the crown reinforcement.

The carcass reinforcement of a radial tire comprises a plurality of reinforcing elements, usually organized in a single layer, particularly in the case of metal reinforcing elements. These reinforcing elements are parallel to one another and make an angle of between 85° and 95° with the circumferential direction. The carcass reinforcement comprises a main part connecting the two beads to one another and which is wrapped within each bead around a bead wire core. A bead wire core comprises a circumferential reinforcing element, usually made of metal, surrounded by at least one other material: nonexhaustively this might be a polymer material or a textile material. The carcass reinforcement is wrapped around the bead wire core from the inside of the tire toward the outside to form a turned-back portion comprising a free end. Turning the carcass reinforcement back within each bead anchors the carcass reinforcement to the bead wire core of the bead.

It is also known practice for each bead to contain an additional reinforcement consisting of at least one layer of reinforcing elements, which is adjacent to at least part of the carcass reinforcement.

The carcass reinforcement or additional reinforcement reinforcing elements, in the case of a tire for a heavy goods vehicle, are usually metal cords. However, reinforcing elements consisting of collections of textile filaments, preferably made of aliphatic polyamides or of aromatic polyamides are also conceivable. In the case of reinforcing elements consisting of collections of textile filaments, the carcass reinforcement usually comprises several layers of reinforcing elements, the number of which is determined according to the level of mechanical strength required of the carcass reinforcement.

Each bead comprises a filler profiled element extending the bead wire core radially outwards. The filler profiled element has, in any meridian plane, a triangular cross section and is formed of at least one polymer material. The filler profiled element may be formed of a stack in the radial direction of at least two polymer materials in contact along a contact surface that intersects any meridian plane along a meridian line. The filler profiled element axially separates the main part of the carcass reinforcement and the turned-back portion or the additional reinforcement.

A polymer material, after curing, is mechanically characterized by its elastic stresses and its rupture properties, which are determined by tensile testing. This tensile testing is carried out by the person skilled in the art in accordance with a known method, for example in accordance with French standard NF T 46-002, September 1988. The so-called "nominal" secant moduli (or apparent stresses, in MPa) or the so-called "true" secant moduli (in this case with respect to the actual cross section of the test specimen) at 10% elongation (denoted respectively "M10" and "E10"), at 100% elongation (denoted respectively "M100" and "E100") and at 300% elongation (denoted respectively "M300" and "E300") are measured in second elongation, which means to say after an accommodation cycle. All these tensile test measurements are carried out under normal temperature (23+ or −2° C.) and hygrometry (50+ or −5% relative humidity) conditions in accordance with French standard NF T 40-101, December 1979. The stresses at rupture (in MPa) and the elongations at rupture (in %) are also measured at a temperature of 23° C. In this document, the elastic modulus of the polymer material of the filler profiled element means the nominal secant modulus at 10% elongation as defined above.

A polymer material, after curing, is also mechanically characterized by its hardness. The hardness is notably defined by the Shore A hardness determined in accordance with standard ASTM D 2240-86.

In use, the tire is mounted on a mounting rim comprising two rim seats intended to be in contact with the radially innermost parts of the two beads and, axially on the outside of each rim seat, a rim flange that is intended to fix the axial position of the said bead when the tire is mounted and inflated.

During running, the beads of the tire are subjected to bending cycles as they wrap around the rim flanges, that is to say as they partially adopt the generally circular geometry of the said rim flanges. This bending is particularly manifested in the form of variations in curvature combined with variations in the tension in the reinforcing elements present in the beads, particularly those in the main part of the carcass reinforcement, the turned-back portion and the additional reinforcement. In addition, these bending cycles introduce into the polymer materials of the filler profiled element and, more particularly, in the immediate vicinity of the free ends of the turned-back and additional reinforcement reinforcing elements, compressive and tensile loadings which generate stresses and thermomechanical deformations which, over time, are likely to degrade the tire, causing it to need to be replaced.

Documents EP 0 826 524 and EP 0 992 369 have already described, in the case of a radial carcass reinforcement, beads the thermomechanical integrity of which is improved with a view to lengthening the life of the tire. These beads comprise two or three polymer materials in the filler profiled element which have different hardnesses, and of which the relative positions in the bead and the contact surfaces are optimized in order to reduce the stresses and thermomechanical deformations within the bead.

Document U.S. Pat. No. 6,000,452 has also described a bead intended to prevent premature tire degradation. The proposed technical solution is a bead that has two filler profiled element polymer materials of different hardnesses, the polymer material of greatest hardness being adjacent to the bead wire core and having a geometric volume greater than a given percentage of the total geometric volume of the filler profiled element.

Document US 2008/0035261 A1 also describes a bead with extended life. The technical solution proposed is a bead that has two filler profiled element polymer materials with different elastic moduli, the polymer material with the highest modulus being adjacent to the bead wire core and having an L-shaped geometry, for a radial carcass reinforcement layer wrapped around the bead wire core with different types of turn-back.

SUMMARY OF THE INVENTION

One object of the invention is to improve the durability of the beads of a tire for a heavy goods vehicle subjected to severe load and pressure conditions, that is to say to conditions that are significantly more severe than the nominal loading and pressure conditions specified by the "European Tire and Rim Technical Organization" standards. By way of non-limiting examples, a load equal to 1.5 times the static nominal load or a pressure equal to 1.2 times the nominal pressure are considered to be severe.

This and other objects are attained in accordance with one aspect of the invention directed to:

a tire for a heavy goods vehicle comprising two beads intended to come into contact with a rim and connected respectively via two sidewalls to a tread strip, this tire comprising a carcass reinforcement comprising a plurality of reinforcing elements, this carcass reinforcement comprising a main part wrapped within each bead around a bead wire core to form a turned-back portion, each bead comprising an additional reinforcement and a filler profiled element extending the bead wire core radially outwards, this filler profiled element having, in any meridian plane, a triangular cross section and being formed of a stack in the radial direction of at least two polymer materials in contact along a contact surface that intersects any meridian plane along a meridian line, the axially outermost end of the meridian line of any contact surface for contact between two polymer materials of the filler profiled element being the radially outermost point of the said meridian line, the axially innermost end of the said meridian line being the radially innermost point on the said meridian line, the said meridian line being at least partially radially on the outside of the straight line that passes through the two ends of the said meridian line, the elastic modulus of the polymer material of the filler profiled element in contact with the bead wire core being greater than the elastic modulus of any other polymer material of the filler profiled element.

The meridian line of any contact surface for contact between two polymer materials of the filler profiled element is axially bounded on the outside by the turned-back portion of carcass reinforcement, by the additional reinforcement or by a polymer compound axially on the outside of the filler profiled element: this boundary is the axially outermost end of the said meridian line.

The meridian line of any contact surface for contact between two polymer materials of the filler profiled element is bounded axially on the inside either by the carcass reinforcement or by the additional reinforcement: this boundary is the axially innermost end of the said meridian line.

The meridian line of any contact surface for contact between two polymer materials of the filler profiled element is not necessarily continuous: it may be intersected by the turned-back portion of carcass reinforcement or the additional reinforcement.

According to an embodiment of the invention, it is advantageous to have the axially outermost end of the meridian line of any contact surface for contact between two polymer materials of the filler profiled element as the point on the said meridian line that is radially outermost and to have the axially innermost end of the said meridian line as the point on the said meridian line that is radially innermost. This geometric positioning of the ends of the said meridian line is combined with the geometric positioning of the said meridian line at least partially radially on the outside of the straight line that passes through the two ends of the said meridian line. This geometric configuration makes it possible, for any meridian line, to have a shape the curvature of which is at least partially of the same sign as that of the rim flange the meridian profile of which is generally circular. The inventors believe that this makes it easier for the bead to wrap around the rim flange when the tire is under load. What is meant by easier to wrap around is that the wrap-around spreads the stresses and deformations in the bead and avoids concentrations of stress and deformation in localized regions of the bead, thus leading to better bead durability and therefore to a longer tire life.

It is also advantageous, according to an embodiment of the invention, to have the elastic modulus of the polymer material of the filler profiled element in contact with the bead wire core higher than the elastic modulus of any other polymer material of the filler profiled element. This is because this polymer material of the filler profiled element in contact with the bead wire core provides the transition between the polymer filler compounds which are radially on the outside of it and the polymer compound of the bead wire core the higher modulus of which also provides progressiveness with respect to the modulus of the metal reinforcing element of the bead wire core. This design provides a transition in rigidity that further limits stress and deformation concentrations within this polymer material of the filler profiled element in contact with the bead wire core, and therefore risk of premature mechanical degradation of the bead.

It is also advantageous to have the axially outermost end of the meridian line of any contact surface for contact between two polymer materials of the filler profiled element as the point on the said meridian line that is axially furthest from the main part of the carcass reinforcement.

It is also advantageous to have the axially innermost end of the meridian line of any contact surface for contact between two polymer materials of the filler profiled element as the point on the said meridian line that is axially closest to the main part of the carcass reinforcement.

According to one preferred embodiment of the invention, the meridian line of any contact surface for contact between two polymer materials of the filler profiled element is convex, which means to say at any point on the said meridian line the centre of curvature is positioned radially on the inside of the meridian line. In the extreme case where the centre of curvature at any point on the meridian line is positioned radially on the inside and at infinity, the meridian line is a straight line: it is still qualified as convex and as being an extreme case of convexness.

This being so, any meridian line at any point has a curvature of the same sign as that of the rim flange and this, according to the inventors, guarantees optimum wrapping of the bead around the rim flange when the tire is under load. Optimum wrapping means wrapping that spreads the stresses and deformations through the bead while minimizing them.

According to one advantageous embodiment of the invention, the elastic modulus of any polymer material of the filler profiled element is at least equal to 1.2 times the elastic modulus of the polymer material of the filler profiled element with which it is in contact and which is radially on the outside of it. Therefore the elastic moduli of the various polymer materials of the filler profiled element follow a decreasing geometric progression when moving radially towards the outside of the bead wire core. This minimum ratio of 1.2 between the elastic moduli of two polymer materials of the filler profiled element in contact with one another means that the flexural rigidity gradient of the bead is progressive when moving radially towards the outside of the bead wire core.

It is also advantageous for the elastic modulus of any polymer material of the filler profiled element to be at most equal to 10 times the elastic modulus of the polymer material of the filler profiled element which is radially on the outside of and adjacent to it. This maximum ratio of 10 between the elastic moduli of two polymer materials of the filler profiled element in contact with one another makes it possible, when passing from one polymer material to the material in contact with and radially on the outside of it, to avoid there being a sudden variation in the stresses and deformations in the bead, which would thus penalize the durability of the bead.

According to another advantageous embodiment of the invention the filler profiled element comprises at least three polymer materials. This minimum number of three polymer materials in the filler profiled element, these being radially superposed in the filler profiled element, allows the variation in flexural rigidity of the bead to be progressive by choosing respective elastic moduli of the three polymer materials in the filler profiled element.

It is also advantageous for the elastic modulus of any polymer material in the filler profiled element to be at least equal to 2 MPa. A lower value could lead to excessive flow deformation in a tire bead, causing a dissipation of heat energy liable to bring about premature bead failure.

It is also advantageous for the elastic modulus of any polymer material in the filler profiled element to be at most equal to 25 MPa. Above this value, bead flexing would be insufficient because the bead rigidity would be too high, hence leading to a risk of premature mechanical bead failure.

Another advantageous embodiment of the invention is characterized by the fact that any turned-back end of carcass reinforcement and of any end of additional reinforcement is away from any meridian line of any contact surface for contact between two polymer materials of the filler profiled element. By way of nonlimiting example, a radial distance of a turned-back end of carcass reinforcement or of additional reinforcement with respect to a meridian line at least equal to 2 mm can be considered as a position distant from the said meridian line. This distance needs to be enough to prevent convergence between a turned-back free end of carcass reinforcement and of additional reinforcement, which is mechanically aggressive because of the presence of cut metal reinforcing element ends, and a contact surface for contact between polymer materials of the filler profile element, which is less robust than the regions at the heart of the said polymer materials.

According to an embodiment of the invention, it is also advantageous to have the radial distance between the ends of the meridian line of any contact surface for contact between two polymer materials of the filler profiled element at least equal to 5% of the design section height H of the tire. The "design section height" of a tire is defined by the "Design Guide" of the "European Tire and Rim Organization" (part C—Commercial Vehicle Tires). A radial distance between the ends of the said meridian line that is shorter than this minimum distance leads to there being obtained a meridian line that has the shape of a straight line almost parallel to the axis of rotation and therefore of practically zero curvature: this prevents the desired wrapping of the bead over the rim flange.

Another advantage, according to an embodiment of the invention, of having the radial distance between the ends of the meridian line of any contact surface for contact between two polymer materials of the filler profiled element is at most equal to 15% of the design section height H of the tire. A radial distance between the ends of the said meridian line that is greater than this maximum distance leads to a meridian line of which the curvature at any point is very much greater than that of the rim flange, and this once again means that the desired wrapping of the bead over the rim flange cannot be obtained.

BRIEF DESCRIPTION OF THE DRAWINGS

The features of the invention will be better understood with the aid of the description of attached FIGS. 1 to 5, which depict embodiments of the invention:

In order to make them easier to understand, FIGS. 1 to 5 are not drawn to scale.

DETAILED DESCRIPTION OF THE DRAWINGS

Figure 1:
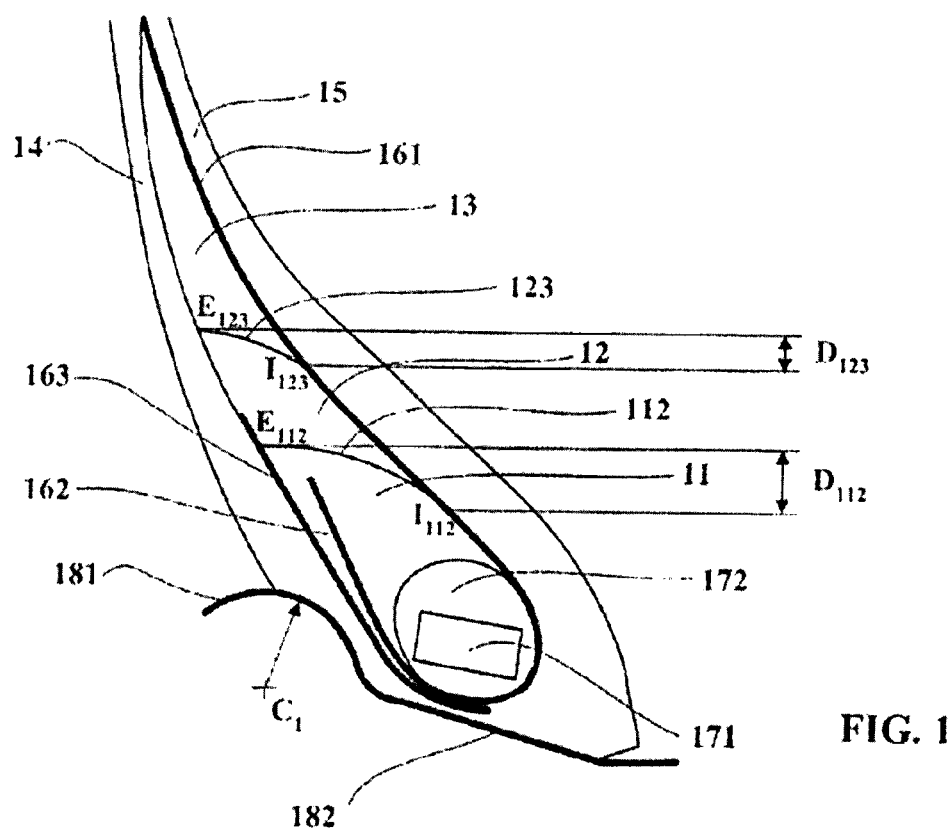
FIG. 1 is a view in section on a meridian plane of the bead of a tire for a heavy goods vehicle, according to a preferred first embodiment of the invention.

FIG. 1 depicts a tire bead for a heavy goods vehicle, according to a preferred first embodiment of the invention.

This preferred first embodiment comprises, in each bead:
- a main carcass reinforcement part 161 comprising a single layer of metal reinforcing elements, wrapped around a bead wire core to form a turned-back portion 162,
- this bead wire core comprising a circumferential reinforcing element made of metal 171 surrounded by a polymer material 172,
- an additional reinforcement 163,
- a filler profiled element extending the bead wire core radially outwards and having, in any meridian plane, a triangular cross section and being formed of a stack in the radial direction of three polymer materials 11, 12, 13 in contact with one another respectively along a contact surface that intersects any meridian plane along a meridian line 112, 123,
- a polymer material 14, that is axially the outermost one, in contact with the air in the atmosphere,
- a polymer material 15, that is radially the innermost one, in contact with the gas with which the tire is inflated,
- a rim, comprising a rim flange 181 of circular meridian profile, around which the bead of the tire can flex (bend) and a wrap when the tire is under load, and a seat 182, in contact with the radially innermost part of the bead.

Each meridian line 112, 123 in FIG. 1 has:
- its axially outermost end ($E_{112}$, $B_{123}$) radially furthest towards the outside and axially furthest away from the main part 161 of the carcass reinforcement,
- its axially innermost end ($I_{112}$, $I_{123}$) radially furthest towards the inside and axially closest to the main part 161 of the carcass reinforcement,
- all its points radially on the outside of the straight line passing through the two ends of the said meridian line.

In addition, each meridian line 112, 123 in FIG. 1 is convex.

The axially outermost end $E_{112}$ of the meridian line 112 is in contact with the additional reinforcement 163 whereas its axially innermost end $I_{112}$ is in contact with the main part 161 of the carcass reinforcement. The axially outermost end $E_{123}$ of the meridian line 123 is in contact with the polymer material 14, whereas its axially innermost end $I_{123}$ is in contact with the main part 161 of the carcass reinforcement.

The radial distances between the axially outermost end and the axially innermost end of each meridian line 112 and 123 are $D_{112}$ and $D_{123}$ respectively.

Figure 2:
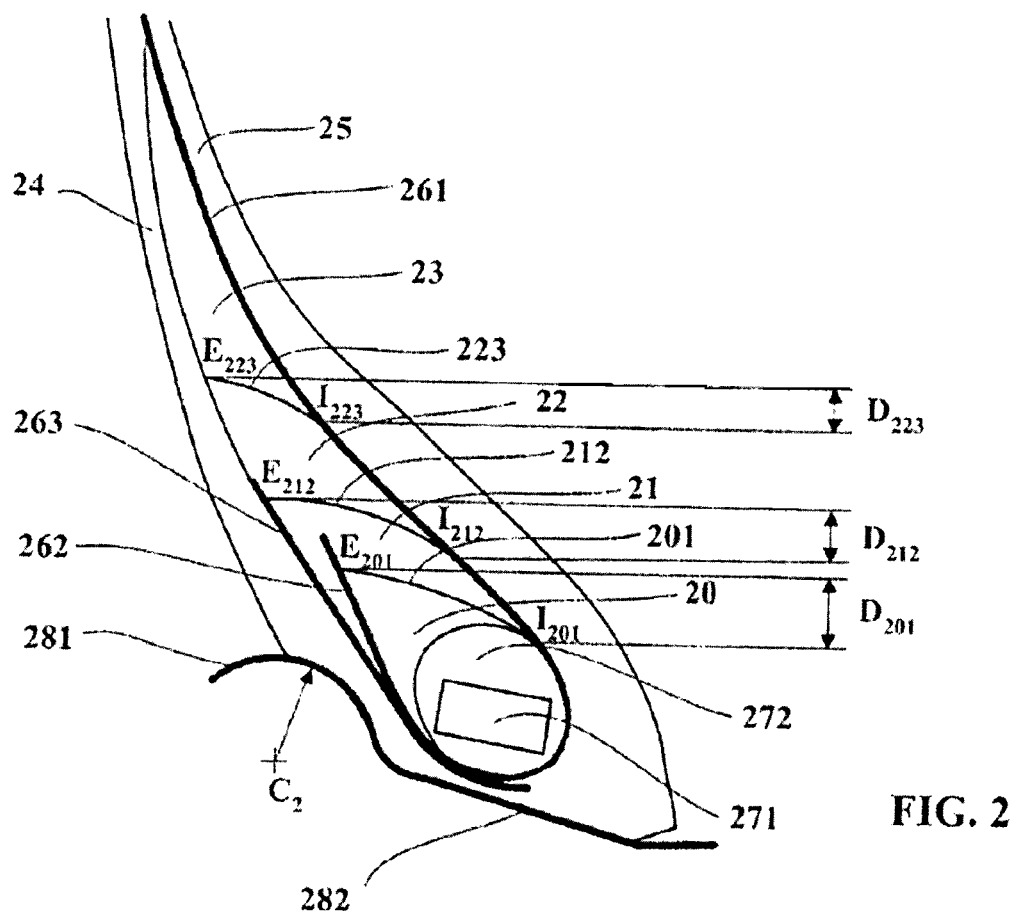
FIG. 2 is a view in section on a meridian plane of the bead of a tire for a heavy goods vehicle, according to a preferred second embodiment of the invention.

The embodiment of FIG. 2 differs from that of FIG. 1 in that there is an additional polymer filler material 20 in contact with the polymer filler material 21 along a contact surface the meridian line of which is 201. The meridian line 201 is characterized by an axially outermost end $E_{201}$ in contact with the turned-back portion 262, an axially innermost end $I_{201}$ in contact with the main part 261 of the carcass reinforcement, and a radial distance between the two ends $D_{201}$.

Figure 3:
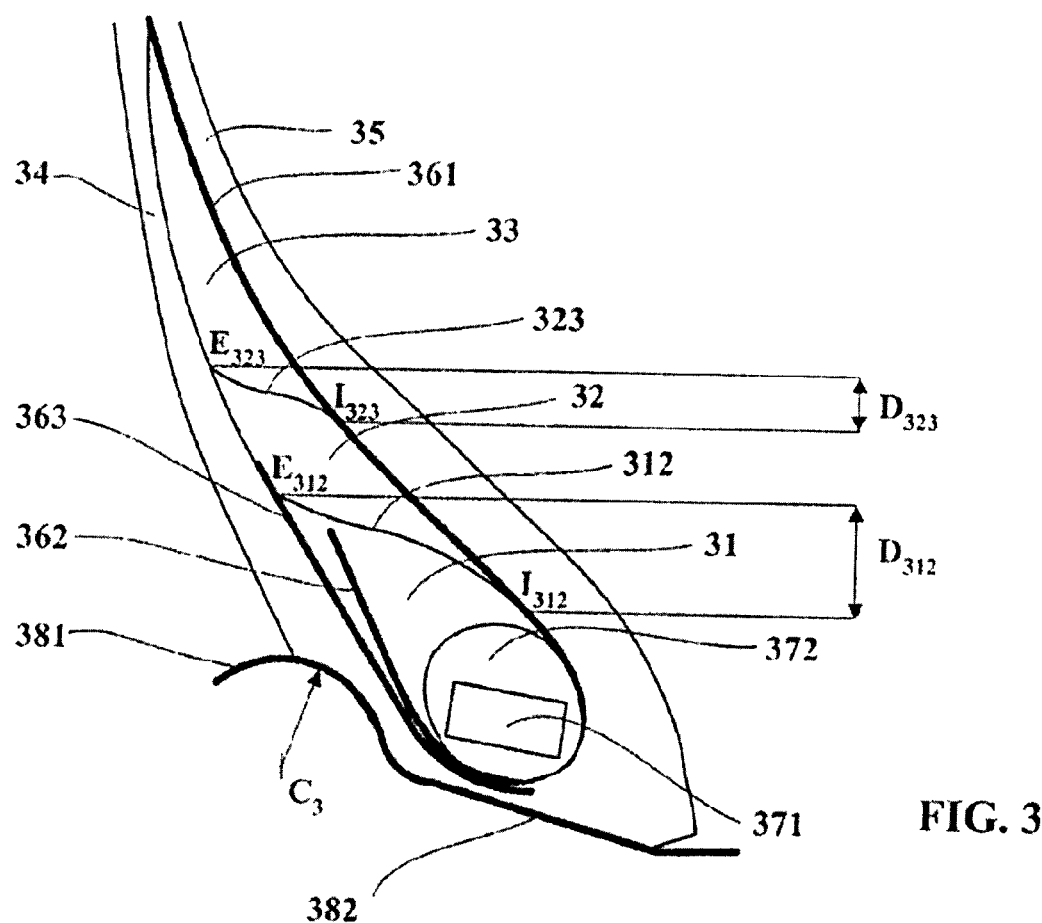
FIG. 3 is a view in section on a meridian plane of the bead of a tire for a heavy goods vehicle, according to a preferred third embodiment of the invention.

The embodiment of FIG. 3 differs from that of FIG. 1 in that it has partially convex meridian lines, which means to say lines at least part of which is radially on the outside of the straight line passing through the two ends of the said meridian line.

Figure 4:
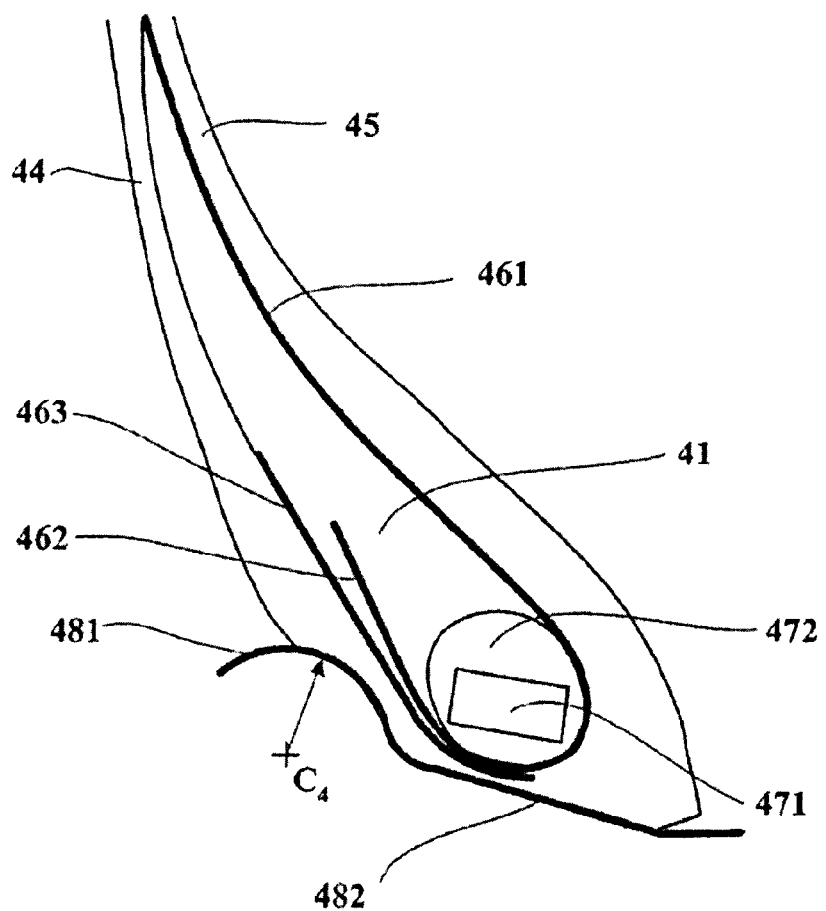
FIG. 4 is a view in section on a meridian plane of the bead of a tire for a heavy goods vehicle, taken as reference in the prior art.

FIG. 4 shows a bead of a tire for a heavy goods vehicle, taken as a reference in the prior art. Such a bead comprises a filler profiled element consisting of a single polymer material 41.

Figure 5:
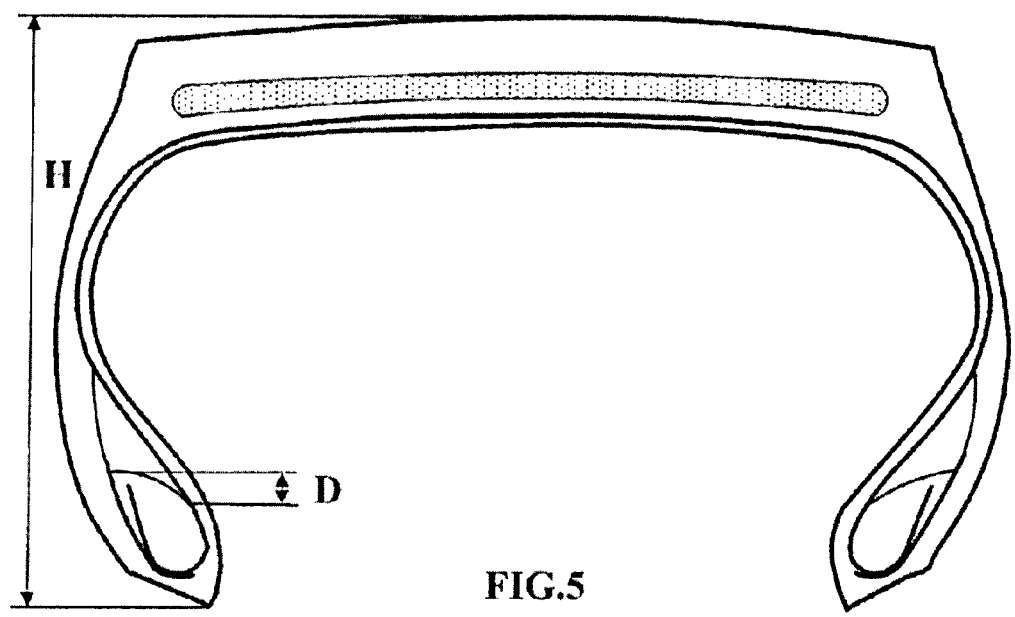
FIG. 5 is an overall view in section on a meridian plane of a heavy goods vehicle tire.

FIG. 5 schematically depicts the two characteristic radial distances H, which is the "design section height" as defined by the "Design Guide" of the "European Tire and Rim Technical Organization" (part C—Commercial Vehicle Tires), and D which is the radial distance between the two ends of a given meridian line.

The invention has been devised more specifically in the case of a heavy goods vehicle tire of size 315×60R22.5. According to the European Tire and Rim Technical Organization, the nominal service conditions for such a tire are an inflation pressure of 9 bar, a static load of 3550 kg and a speed of 120 km/h. In addition, the design section height H of such a tire is 189 mm.

The 315×60R22.5 tire was designed in accordance with the invention according to the preferred embodiment schematically depicted in FIG. 1. The radial distance $D_{112}$ between the axially outermost end and the axially innermost end of the meridian line 112 is equal to 13 mm. As a result, the ratio $D_{112}/H$ is equal to 7% and is therefore greater than 5% and less than 15%. The radial distance $D_{123}$ between the axially outermost end and the axially innermost end of the meridian line 123 is equal to 19 mm. Therefore the ratio $D_{123}/H$ is equal to 10% and is therefore greater than 5% and less than 15%.

As far as the elastic moduli of the polymer materials of the filler profiled element are concerned, the ratio between the elastic moduli of the materials 11 and 12, which are equal to 10 MPa and to 5.5 MPa respectively, is equal to 1.8. The ratio between the elastic moduli of the materials 12 and 13, which are equal to 5.5 MPa and to 3.7 MPa respectively, is equal to 1.5. These two ratios are therefore greater than 1.2 and less than 10, the modulus of the polymer material 11 in contact with the bead wire core being higher than those of the polymer materials 11 and 12.

Endurance running carried out on a tire designed as before, in accordance with the preferred first embodiment, with an applied static load equal to 1.45 times the nominal static load, have demonstrated an improvement of 70% over the reference tire, in terms of the distance the tire can cover, with a single material filler profiled element as illustrated in FIG. 4.

The invention should not be interpreted as being restricted to the examples illustrated in the figures but may be extended to cover other alternative forms of embodiment relating, for example, to the numbers of polymer materials in the filler profiled element, to the shapes of the meridian lines of the contact surfaces for contact between two polymer materials in the filler profiled element, to the elastic moduli of the polymer materials of the filler profiled element and, more generally, to the design of the various parts of the bead such as, nonlimitingly, the bead wire core and the additional reinforcement.

The invention claimed is:

1. A tire for a heavy goods vehicle comprising two beads adapted to come into contact with a rim and connected respectively via two sidewalls to a tread strip, the tire comprising:
   - a carcass reinforcement comprising a plurality of reinforcing elements and a main part wrapped within each of the two beads around a bead wire core to form a turned-back portion,
   - wherein each of the two beads comprises an additional reinforcement and a filler profiled element extending said bead wire core radially outwards,
   - wherein said filler profiled element has, in any meridian plane, three exterior sides including a radially inner side, an axially inner side and an axially outer side, with said axially inner and outer sides converging at a radially outermost point,
   - wherein said filler profiled element is formed of a stack in the radial direction of at least three polymer materials in contact along a contact surface that intersects any meridian plane along a meridian line,
   - wherein an axially outermost end of a meridian line of any contact surface for contact between any two of said three polymer materials of said filler profiled element is said radially outermost point on said meridian line, wherein an axially innermost end of said meridian line is a radially innermost point of said meridian line, wherein said meridian line is at least partially radially on an outside of a straight line that passes through said axially innermost end and said axially outermost end of said meridian line, and wherein a nominal secant elastic modulus at 10% elongation of a polymer material of said three polymer materials of said filler profiled element in contact with said bead wire core is greater than a nominal secant elastic modulus at 10% elongation of any other polymer material of said three polymer materials of said filler profiled element.

2. The tire for a heavy goods vehicle according to claim 1, wherein said axially outermost end of said meridian line of any contact surface for contact between any two of said three polymer materials of said filler profiled element is a point on said meridian line that is axially furthest from a main part of said carcass reinforcement.

3. The tire for a heavy goods vehicle according to claim 1, wherein said axially innermost end of said meridian line of any contact surface for contact between any two of said three polymer materials of said filler profiled element is a point on said meridian line that is axially closest to a main part of said carcass reinforcement.

4. The tire for a heavy goods vehicle according to claim 1, wherein at any point on said meridian line of any contact surface for contact between any two of said three polymer materials of said filler profiled element, a centre of curvature is positioned radially on an inside of the meridian line.

5. The tire for a heavy goods vehicle according to claim 1, wherein the nominal secant elastic modulus at 10% elongation of any of said three polymer materials of said filler profiled element is at least equal to 1.2 times the nominal secant elastic modulus at 10% elongation of a polymer material of said three polymer materials of said filler profiled element with which it is in contact and which is radially on an outside of it.

6. The tire for a heavy goods vehicle according to claim 1, wherein the nominal secant elastic modulus at 10% elongation of any of said three polymer materials of said filler profiled element is at most equal to 10 times the nominal secant elastic modulus at 10% elongation of a polymer material of said three polymer materials of said filler profiled element with which it is in contact and which is radially on the outside of it.

7. The tire for a heavy goods vehicle according to claim 1, wherein any turned-back end of said carcass reinforcement and any end of said additional reinforcement are away from any meridian line of any contact surface for contact between any two of said three polymer materials of said filler profiled element.

8. The tire for a heavy goods vehicle according to claim 1, wherein a radial distance between two ends of a meridian line of any contact surface for contact between any two of said three polymer materials of said filler profiled element is at least equal to 5% of a design section height H of the tire.

9. The tire for a heavy goods vehicle according to claim 1, wherein a radial distance between two ends of a meridian line of any contact surface for contact between any two of said three polymer materials of said filler profiled element is at most equal to 15% of a design section height H of the tire.

* * * * *